United States Patent
Michiels et al.

(10) Patent No.: US 9,654,280 B2
(45) Date of Patent: May 16, 2017

(54) WHITE-BOX CRYPTOGRAPHIC SYSTEM WITH INPUT DEPENDENT ENCODINGS

(75) Inventors: Wilhelmus Petrus Adrianus Johannus Michiels, Eindhoven (NL); Paulus Mathias Hubertus Mechtildis Antonius Gorissen, Eindhoven (NL)

(73) Assignee: IRDETO B.V., LS Hoofddorp (NL)

( * ) Notice: Subject to any disclaimer, the term of this patent is extended or adjusted under 35 U.S.C. 154(b) by 0 days.

(21) Appl. No.: 13/255,382

(22) PCT Filed: Mar. 5, 2010

(86) PCT No.: PCT/EP2010/052846
§ 371 (c)(1),
(2), (4) Date: Sep. 8, 2011

(87) PCT Pub. No.: WO2010/102960
PCT Pub. Date: Sep. 16, 2010

(65) Prior Publication Data
US 2012/0002807 A1    Jan. 5, 2012

(30) Foreign Application Priority Data

Mar. 10, 2009 (EP) .................................... 09154698

(51) Int. Cl.
*H04L 9/00* (2006.01)
*H04L 9/06* (2006.01)

(52) U.S. Cl.
CPC ............ *H04L 9/0631* (2013.01); *H04L 9/002* (2013.01); *H04L 2209/16* (2013.01)

(58) Field of Classification Search
CPC .... H04L 9/0631; H04L 9/002; H04L 2209/16
See application file for complete search history.

(56) References Cited

U.S. PATENT DOCUMENTS

| 6,696,992 | B1* | 2/2004 | Chu ................................. 341/67 |
| 2006/0014041 | A1 | 6/2006 | Johnson et al. |
| 2009/0254759 | A1* | 10/2009 | Michiels et al. .............. 713/189 |

FOREIGN PATENT DOCUMENTS

| CN | 101536398 A | 9/2009 |
| JP | 2000182012 | 6/2000 |

(Continued)

OTHER PUBLICATIONS

"International Application No. PCT/EP2010/052846, International Search Report and Written Opinion mailed Jun. 2, 2010", (Jun. 2, 2010), 10 pgs.

(Continued)

*Primary Examiner* — Mohammed Waliullah
(74) *Attorney, Agent, or Firm* — Rimon PC; Marc S. Kaufman

(57) ABSTRACT

A white-box cryptographic system is presented wherein at least one of its internal values is represented using an input dependent encoding. The system comprises a network of a plurality of basic blocks arranged for collectively performing a cryptographic operation. An encoder is arranged for encoding output data of a first one of the plurality of basic blocks into an encoder-output according to a selected one of a plurality of encoding schemes, said selection depending on an input-message to the system. A compensator is arranged for recoding intermediate data to compensate for the effect of the encoding according to a selected one of a plurality of recoding schemes. Using variable encodings instead of fixed encodings complicates reverse engineering the white-box cryptographic system.

13 Claims, 8 Drawing Sheets

(56) References Cited

FOREIGN PATENT DOCUMENTS

| | | | |
|---|---|---|---|
| JP | 2002247025 A | | 8/2002 |
| JP | 2002366029 A | | 12/2002 |
| JP | 2008098690 A | | 4/2008 |
| JP | 2008131108 A | | 6/2008 |
| JP | 2008233683 A | | 10/2008 |
| WO | WO-02/46890 A2 | | 6/2002 |
| WO | 2006112114 A1 | | 10/2006 |
| WO | WO 2007105126 A2 | * | 9/2007 |

OTHER PUBLICATIONS

Biryukov, A., et al., "A Toolbox for Cryptanalysis: Linear and Affine Equivalence Algorithms", Proceedings of Eurocrypt, (2003), 33-50.

Chow, Stanley, et al., "A White-Box DES Implementation for DRM Application", Proceedings of ACM CCS-9 Workshop DRM, (Nov. 18, 2002), 1-16.

Chow, Stanley, et al., "White-Box Cryptography and an AES Implementation", 9th Annual International Workshop, SAC 2002, St. John's Newfoundland, Canada, (Aug. 15-16, 2002), 250-270.

Michiels, W., et al., "Cryptanalysis of a Generic Class of White-Box Implementations", Proceedings of the 15th Annual Workshop on Selected Areas in Cryptography (SAC 2008), Sackville, New Brunswick, Canada, (2008), 392-406.

Chinese Search Report cited in corresponding Application No. 201080014314.7 dated Oct. 28, 2013.

Daisuke Suzuki et al, "Evaluation of Side-Channel Resistance for Block Cipher", The 2009 Symposium on Cryptography and Information Security, Jan. 20-23, SCIS 2009.

Koichi Fujisaki, "Development of DPA Evaluation Platform for 8 bit Processor", The Institute of Electronics, Information and Communication Engineers, 2004.

Kohji Takano et al., "Small Hardware Architecture of the Advanced Encryption Standard", Tokyo Research Lab, IBM Japan Ltd.

Tatsunori Tsujimura et al., "Table-Network-Based FPGA Implementations of AES and Their Resistance Against Differential Power Analyses", The Institute of Electronics, Information and Communication Engineers, 2006.

Teruyoshi Yamaguchi et al., "The new method of Table-network-based AES implementation", The 2009 Symosium on Cryptography and Information Security, SCIS 2009.

Teruyoshi Yamaguchi et al., "The new method of Table-network-based AES implementation", The 2008 Symosium on Cryptography and Information Security, SCIS 2008.

Communication Pursuant to Article 94(3) EPC cited in European Application No. 10707274.6 dated May 23, 2016.

* cited by examiner

WHITE-BOX CRYPTOGRAPHIC SYSTEM WITH INPUT DEPENDENT ENCODINGS

PRIORITY CLAIM TO RELATED APPLICATIONS

This application is a national stage application under 35 U.S.C. §371 of PCT/EP2010/052846, filed Mar. 5, 2010, and published as WO 2010/102960 A1 on Sep. 16, 2010, which claims priority to European Application No. 09154698.6, filed Mar. 10, 2009, which applications and publication are incorporated herein by reference and made a part hereof in their entirety, and the benefit of priority of each of which is claimed herein.

FIELD OF THE INVENTION

The invention relates to a cryptographic system for performing a keyed cryptographic operation mapping an input-message to an output-message, the system comprising a network of a plurality of basic blocks representing said key, at least some of the basic blocks being arranged for mapping input data to output data, the plurality being arranged for collectively performing the cryptographic operation.

BACKGROUND OF THE INVENTION

The Internet provides users with convenient and ubiquitous access to digital content. Because of the potential of the Internet as a powerful distribution channel, many consumer electronics (CE) products strive to directly access the Internet or to interoperate with the PC platform—the predominant portal to the Internet. The CE products include, but are not limited to, digital set top boxes, digital TVs, game consoles, PCs and, increasingly, hand-held devices such as PDAs, mobile phones, and mobile storage and rendering devices, such as Apple's iPod. The use of the Internet as a distribution medium for copyrighted content creates the compelling challenge to secure the interests of the content provider. In particular it is required to warrant the copyrights and business models of the content providers. Increasingly, CE platforms are operated using a processor loaded with suitable software. Such software may include the main part of functionality for rendering (playback) of digital content, such as audio and/or video. Control of the playback software is one way to enforce the interests of the content owner including the terms and conditions under which the content may be used. Where traditionally many CE platforms (with the exception of a PC and PDA) used to be closed, nowadays more and more platforms at least partially are open. In particular for the PC platform, some users may be assumed to have complete control over the hardware and software that provides access to the content and a large amount of time and resources to attack and bypass any content protection mechanisms. As a consequence, content providers must deliver content to legitimate users across a hostile network to a community where not all users or devices can be trusted.

Typically, digital rights management systems use an encryption technique based on block ciphers that process the data stream in blocks using a sequence of encryption/decryption steps, referred to as rounds. During each round, a round-specific function is performed. The round-specific function may be based on a same round function that is executed under control of a round-specific sub-key. For many encryption systems, the round function can be specified using mapping tables or look-up tables. Even if the specification of the round function does explicitly comprise the use of tables, nevertheless, tables are frequently used in implementation for different parts of the function for efficient execution in software of encryption/decryption functions. The computer code accesses or combines table values into the range value of the function. Instead of distributing keys that may be user-specific, it becomes more interesting to distribute user specific algorithms instead of keys for encryption or decryption algorithms. These algorithms, most often functions (mappings), have to be obfuscated (hidden) in order to prevent redesign or prohibit the re-computation of elements that are key-like. On computers, tables accompanied with some computer code often represent these functions.

Content providers must deliver content to legitimate users across a hostile network to a community where not all users or devices can be trusted. In particular for the PC platform, the user must be assumed to have complete control of the hardware and software that provides access to the content, and an unlimited amount of time and resources to attack and bypass any content protection mechanisms. The software code that enforces the terms and conditions under which the content may be used must not be tampered with. The general approach in digital rights management for protected content distributed to PCs is to encrypt the digital content, for instance DES (Data Encryption Standard), AES (Advanced Encryption Standard), or using the method disclosed in WO9967918, and to use decryption keys.

The two main areas of vulnerability of digital rights management relying on encryption are the software plug-ins which enforce the terms and conditions under which the content may be used, and the key distribution and handling.

Typically, the plug-in enforces the teams and conditions under which the content is to be used. An attacker aiming to remove these terms and conditions may attempt to achieve this through tampering of the program code comprised in the software plug-in.

In relation to key handling, for playback a media player has to retrieve a decryption key from a license database. It then has to store this decryption key somewhere in memory for the decryption of the encrypted content. This leaves an attacker two options for an attack on the key. Firstly, reverse engineering of the license database access function could result in black box software (i.e., the attacker does not have to understand the internal workings of the software function), allowing the attacker to retrieve asset keys from all license databases. Secondly, by observation of the accesses to memory during content decryption, it is possible to retrieve the asset key. In both cases the key is considered to be compromised. In the following, a description of how in general software may be made tamper-resistant is provided.

Tamper-resistant software is so called because goal-directed tampering with the software is complicated. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the application, and consequently to change it.

"White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1", and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2", disclose methods with the intend to hide the key by a combination of encoding its tables with random bijections, and extending the cryptographic boundary by pushing it out further into the containing application.

SUMMARY OF THE INVENTION

However, a weakness in the approach of Chow is pointed out in "Cryptanalysis of a Generic Class of White-Box Implementations", by W. Michiels, P. Gorissen and H. D. L. Hollmann, to appear in: Proceedings of the 15th Annual Workshop on Selected Areas in Cryptography (SAC 2008), Sackville, New Brunswick, Canada, 2008, referred to hereinafter as "Michiels 1". This weakness may be exploited by an attacker, and may in a worst case result in revealing the secret key hidden in the white-box implementation.

The key observation by Michiels et al. is that the individual input words of the respective rounds in a white box implementation according to Chow are in a particular relation to corresponding input words in an ordinary non-white-box implementation. This relation can be expressed without reference to other input values than the individual input value. Although this relation is key-dependent and unknown to the attacker, this feature provides enough structure to substantially simplify the breaking of the white-box, as further explained in the paper referred to above.

It would be advantageous to have an improved cryptographic system for performing a cryptographic operation which maps an input-message to an output-message. To better address this concern, in a first aspect of the invention a cryptographic system for performing a keyed cryptographic operation mapping an input-message to an output-message is presented. The cryptographic system comprises a network of a plurality of basic blocks representing said key, at least some of the basic blocks being arranged for mapping an input value to an output value, the plurality being arranged for collectively performing the cryptographic operation. The network comprises an encoder for encoding output data of a first one of the plurality of basic blocks into an encoder-output according to a selected one of a plurality of encoding schemes, the encoder is arranged for selecting the selected encoding scheme out of the plurality of encoding schemes in dependency on a selection value which depends on the input-message, a second one of the plurality of basic blocks being arranged for receiving its input through the network encoded according to the selected encoding scheme and depending on the encoder-output, and a compensator for recoding an intermediate value depending on an output value of the second basic block to compensate for the effect of the encoding according to a selected one of a plurality of recoding schemes, the compensator being arranged for selecting the selected recoding scheme out of the plurality of recoding schemes in dependency on the selection value.

More generally, output data of a first block is encoded according to an input depended encoding scheme. A compensator later adjusts for the encoding.

As noted in the key observation, one reason why the construction of Chow is vulnerable is the fixed relation that exists between individual input values of respective rounds in the white-box implementation and individual input values in the ordinary non-white-box implementation. In the invention an encoder is introduced which encodes a value, not according to some fixed encoding scheme, but with an encoding which is chosen out of a plurality of encodings. This feature breaks the fixed relationship. The encoder-output is no longer in a fixed relationship with some individual input value in the non-white box implementation of the cryptographic operation. Although some relation will exist, it will depend not only on the individual input value but also on other input values. This complication is enough to foil the attack laid out in Michiels 1.

By breaking the fixed encoding of values reverse engineering of the cryptographic system becomes harder, as it is harder for the reverse engineer to compare the working of the cryptographic system according to the invention with the workings of a non-white-box version of the cryptographic operation.

It is noted that the term 'first' in 'first basic block', is used to distinguish the first basic block from the other basic blocks. The first basic block need not necessarily be a basic block that receives the input-message.

As noted, for many cryptographic operations it is desired to have a white-box implementation. The invention may be applied, for example, to symmetric and asymmetric cryptographic operations. Also, the invention may be applied to block ciphers, stream ciphers, message authentication schemes, signature schemes, etc. Note that the invention may also be applied to hash functions. The latter is especially useful if the hash function is used as a building block which processes secret information, e.g., a secret key, secret data, etc. For example, the invention may be applied to a hash function used in a keyed-Hash Message Authentication Code (HMAC or KHMAC). Well known block ciphers include: Advanced Encryption Standard (AES), Secure And Fast Encryption Routine, (SAFER, and variants SAFER+ and SAFER++), Blowfish, Data Encryption Standard (DES), etc. A well known stream cipher is RC4. Moreover any block cipher can be used as stream cipher using an appropriate mode of operation, e.g., Cipher feedback (CFB), Counter mode (CTR), etc.

The input message can represent, e.g., encrypted content data, such as multi-medial data, including audio and/or video data. The encrypted content data may also comprise encrypted software, e.g., encrypted computer code representing some computer application, e.g., a computer game, or an office application. The input message may also represent a key for use in a further cryptographic operation. The latter may be used, for example, in a key exchange protocol, wherein a white-box implementation according to the invention encrypts and/or decrypts data representing a new key. The input data may also be plain data, for example, plain user data. The latter is especially advantageous in message authentication schemes. A white-box implementation according to the invention may have the property that the implementation may only be used for encryption, only be used for decryption, but not for both. For example, this property can be achieved if the implementation uses look-up tables which are not bijective, for example, a look-up table having more input bits than output bits. Accordingly, if a user only has a white-box decryptor, he may verify a MAC code but not create new MACs. This strengthens the non-repudiation properties of such a message authentication scheme.

The plurality of basic blocks is interconnected, in the sense that some of the blocks build on the outputs of one or more of the previous blocks. A basic block may be implemented in hardware, for example, as a computer chip. A basic block may use a switch board, a state machine or any other suitable construction for implementing functions in computer hardware. A basic block may also be implemented in software running on a general purpose computer chip, e.g. a microprocessor. For example, a basic block may use a plurality of computer instructions, including arithmetical instructions, which together implement the functionality of the basic block. A preferred implementation for the basic block, which may be used both in software and hardware, is a look-up table. A look-up table implementation comprises a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number input bits and produces the same number of output bits. The input encoding and output encoding used in such obfuscation are not explicit in the final white-box implementation. A better obfuscation is achieved in the invention, which introduces encodings which are not fixed but rather depend on a selection value. It is noted that the variable encoding described herein can be combined with traditional obfuscation techniques to advantage, as together they further obscure the inner workings of the cryptographic operation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collective computes the mapping from the input message to output message.

The key used is preferably a cryptographic key, and preferably contains sufficient entropy to withstand an anticipated brute force attack. It is noted that in a white-box implementation, the key is preferably not explicitly present in the implementation. This would risk the key being found by inspection of the implementation. Preferably, the key is only present implicitly. Various ways are known to hide a key in a cryptographic system. Preferably, at least the method of partial evaluation is used, wherein a basic block which needs key input is evaluated in-so-far that it does not depend on the input-message. For example, a basic operation wherein an input-value, a masking value, which does not depend on the input-message, e.g. a value from an s-box, and a key-value need to be xor-ed can be partially evaluated by xor-ing the key value and the masking value together beforehand. In this way the operation still depends on the key-value although the key-value is not explicitly present in the implementation. Instead, only the xor-between the key-value and masking-value is present in the implementation. Note that, more complicated ways and/or further ways of hiding the keys are compatible with this invention.

Various encoding schemes may be used with the invention. An encoding scheme gives a new way to represent a data value. An encoding scheme is injective. Preferably, an encoding is also bijective, although this is not necessary.

The selection value may be computed in various ways, for example, the selection value may be computed, using appropriate hardware or software, from the input-message, possibly also depending on other values in the implementation, e.g., from one or more key-dependent values in a look-up table.

The second basic block is arranged to receive data, but encoded with the selected encoding. After the encoding the data progresses through the network in encoded form. Preferably, the second basic block need not be adapted based on the selection value. That is the second basic block may perform the same mapping of input values to output values for each value of the selection value. Optionally, the second basic block operates directly on the output of the encoder substantially without intermediate operations on the encoded data. However, there may also be intermediate operations. Especially, operations which respect the chosen encoding scheme may be performed before the second basic block. An operation which respects an encoding scheme produces the correct output value corresponding to the input value, even though it receives only the encoded input value; however the output value is also encoded with the encoding scheme.

For example, the encoding scheme may act independently but in the same way on different parts of a partition in equal parts of the encoder input. A subsequent permutation which permutes part of the partition respects the encoding. For example, a byte may be encoded by encoding the first and second nibble independent from each other, both with some specific nibble-encoding operation. A subsequent swap of the first and second nibble respects this encoding.

The encoder may operate directly on its input value, for example, on an input value which corresponds to a value in a non-white-box implementation of the same cryptographic operation. On the other hand, some obfuscation may be used, e.g., some type of encoding, may be used for the input value of the encoder, i.e., of the output value of the first basic block. The encoding used for the output value of the first basic block may also depend on the other value, e.g., on the selection value.

For example, said first block, i.e., said first one of the plurality of basic blocks, may produce an output value $\chi+v$. The encoder takes as input the selection value $v$ and the output value $\chi+v$. From these two inputs, the encoder can produce $\chi$ encoded according to the $v$'th encoding scheme of a plurality of encoding schemes. Note that the output value '$\chi$' may be encoded and/or obfuscated in a variety of ways. For example, the first basic block may comprise two look up tables, producing values '$\chi 1$' and '$\chi 2$'. The encoder can reconstruct 'χ', e.g., as the concatenation of 'χ1' and 'χ2'. As a further example: Let $+_o$ be the normal arithmetic addition, i.e., not the XOR addition, a first entity in the first basic block may produce a first value $\chi+_o v$ and a second entity in the first basic block may produce the second value $2\chi+_o v$. From these two values the encoder can reconstruct both 'χ' (e.g. as the arithmetic subtraction of the second value and the first value) and 'v' (e.g., as the arithmetic subtraction of twice the first value and the second value).

If χ corresponds with a value used in a non-white-box implementation of the cryptographic operation for the same key, then it can be seen that after the encoding step in the cryptographic system of the invention, χ occurs encoded according to a an encoding scheme which is selected from multiple encoding schemes in dependency on the input.

As the input value is encoded with an encoding scheme, which is moreover variable, typically the output of the second basic block, i.e., said second one of the plurality of basic blocks, after performing a second basic operation will be disturbed, possibly, significantly so. The compensator recodes the output of the second basic block to account for the effect of the encoding. As the encoding scheme is dependent on the selection value, a recoding scheme is selected which also depends on the selection value. The compensator may also recode an intermediate value which depends on the output of the second basic block. For example, an XOR-network may be arranged in between the second basic block and the compensator.

In a preferred embodiment, the plurality of encoding schemes are self-equivalent encoding schemes of the second basic block. To the selected encoding scheme an output encoding scheme corresponds. The output value of the second block is encoded according to the output encoding scheme. The selected recoding scheme recodes the output value from the output encoding scheme to a further encoding scheme.

A self-equivalent encoding scheme of a basic operation has a corresponding output encoding scheme. The pair of the self-equivalent encoding scheme and the output encoding scheme has the property that the second basic block computes the correct output value corresponding to an input value, even if that input value is encoded using an encoding scheme, although the correct output value is then encoded with the output encoding scheme. The output encoding scheme may be different from the input encoding scheme.

In a preferred embodiment the encoding schemes are affine functions. In particular, it is preferred if the encodings out of which the encoder selects using the selection value are affine self-equivalent encoding. Determining affine self-equivalent encoding, can be done using any suitable manner; For example, as described in the paper "A Toolbox for Cryptanalysis: Linear and Affine Equivalence Algorithms." by A. Biryukov, C. De Cannière, A. Braeken, and B. Preneel, Proceedings of Eurocrypt, 2003, pp. 33-50, referred hereinafter as Biryukov 1.

It is preferred to use an affine self-encoding since this implies that the output of the second basic block is encoded with an affine function. Below it is described how affine encodings may be applied, recoded, or removed with relative ease. Hence if the encodings are affine they can be compensated for without large overhead. For example, the affine encoding may be compensated for by removing the subsequent affine encoding with which the output of the second block is encoded.

In a preferred embodiment, the selection value is at least a part of the output of the first one of the plurality of basic blocks. This requires only little computational resources, yet achieves diversification of the encodings which are used internally.

After the compensator has compensated for the encoding, the compensated output may be further operated upon by basic blocks, e.g., by a third basic block. In a preferred embodiment, the cryptographic system comprises a decoder for removing an encoding on an output of a third one of the plurality of basic blocks according to one of a plurality of encoding schemes.

In a preferred embodiment, the plurality of basic blocks comprises at least a further second basic block arranged for receiving its input through the network encoded according to a further selected encoding scheme, the compensator is arranged for recoding a further intermediate value depending on a further output value of the further second basic block to compensate for the effect of the further encoding according to a further selected one of a plurality of recoding schemes, the recoding scheme is arranged to recode the intermediate value into a first value encoded according to a common encoding scheme, the further recoding scheme is arranged to recode the further intermediate value into a second value encoded according to an encoding scheme, which differs at most an additive with the common encoding scheme.

There may be multiple second blocks which receive encoded input. Since the second basic block and the further second basic block are typically different, they will affect their input encodings differently, accordingly it is of advantage to have a compensator which can compensate in different ways for these differences. Moreover, the inputs may be encoded with the same selected encodings, but preferably they are encoded according to different selected encodings. In particular, the inputs to the second basic block and the further second basic block are preferably encoded with self-equivalent encodings, preferably affine ones. The sets of self equivalent encodings for different basic blocks are typically different. It is of advantage if, after the intermediate value and further intermediate value are compensated, that they are encoded according to a same common encoding. This simplifies further processing. On the other hand, it may also be of advantage if the encodings are equal up to an additive. An additive is a term which is added during the application of an encoding, recoding or decoding step. An example of an additive is a value which is xor-ed in an affine encoding. Preferably, the additive is pre-determined.

For example, if the common encoding scheme is an affine encoding scheme, and the operation following the compensation is an xor of the intermediate and the further intermediate value, then omitting the additive simplifies the computation. If to two values the same additive is xor-ed, and these two values are subsequently xor-ed with each other, then the additive is canceled. However, if the additive was only xor-ed with one of the values, and not to the other, than the additive would not cancel in a subsequent xoring. It is noted, that for bits an xor is an addition over GF(2).

A further aspect of the invention is a cryptographic method for performing a cryptographic operation mapping an input-message to an output-message. The method comprises a plurality of basic mapping operations, each arranged for mapping an input value to an output value, the plurality being arranged for collectively performing the cryptographic operation. The cryptographic method comprises selecting a selected encoding scheme out of a plurality of encoding schemes in dependency on the input-message, and encoding an output value of a first one of the plurality of basic mapping operations into an encoded-output according to the selected encoding scheme, a second one of the plurality of basic mapping operations being arranged for operating on at least the encoder-output as an input value, selecting a selected recoding scheme out of a plurality of recoding schemes in dependency on the selection value, recoding an intermediate value depending on an output value of the second basic mapping operation to compensate for the effect of the encoding according to a selected one of a plurality of recoding schemes.

A further aspect of the invention is a method of establishing a system for performing a cryptographic operation for increased tamper resistance. The system comprises a plurality of basic blocks, each arranged for mapping an input value to an output value, the plurality being arranged for collectively performing the cryptographic operation. The method comprises identifying a first basic block and a second basic block of the plurality of basic blocks, the second basic block being arranged to receive as an input an output of the first basic block, arranging an encoder between the first basic block and the second basic block, the encoder being arranged for encoding the output of the first basic block into an encoder-output according to a selected one of a plurality of encoding schemes, the second basic block being adapted for receiving the encoder-output as an input value, arranging a compensator after the second block, for recoding an intermediate value depending on an output value of the second basic block to compensate for the effect of the encoding according to a selected one of a plurality of recoding schemes, the compensator being arranged for selecting the selected recoding scheme out of the plurality of recoding schemes in dependency on the selection value.

Arranging an encoder between the first basic block and the second basic block can be done, e.g., by arranging the basic software blocks and/or basic hardware blocks such that the encoder receives input, directly or indirectly, from the first block, and the second block receives input, directly or indirectly, from the encoder. Similarly, arranging a compensator after the second block can be done by arranging the compensator to receive input from the second block.

Since white-box cryptography is often very complicated and/or obfuscated it is tedious for a human to write. It is therefore of advantage to have a method to create the cryptographic system according to the invention in an automated manner.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc.

In a preferred embodiment, the computer program comprises computer program code means adapted to perform all the steps of a method according to the invention when the computer program is run on a computer. Preferably, the computer program is embodied on a computer readable medium.

A white-box cryptographic system is thus presented wherein at least one of its internal values is represented using an input dependent encoding. The system comprises a network of a plurality of basic blocks arranged for collectively performing a cryptographic operation. An encoder is arranged for encoding output data of a first one of the plurality of basic blocks into an encoder-output according to a selected one of a plurality of encoding schemes, said selection depending on an input-message to the system. A compensator is arranged for recoding intermediate data to compensate for the effect of the encoding according to a selected one of a plurality of recoding schemes. Using variable encodings instead of fixed encodings complicates reverse engineering the white-box cryptographic system.

BRIEF DESCRIPTION OF THE DRAWINGS

These and other aspects of the invention will be elucidated hereinafter by reference to the drawings, wherein.

DETAILED DESCRIPTION OF EMBODIMENTS

AES is a block cipher with a block size of 128 bits or 16 bytes. The plaintext is divided in blocks of 16 bytes which form the initial state of the encoding algorithm, and the final state of the encoding algorithm is the cipher text. To conceptually explain AES, the bytes of the state are organized as a matrix of 4×4 bytes. AES consists of a number of rounds.

Each round is composed of similar processing steps operating on bytes, rows, or columns of the state matrix, each round using a different round key in these processing steps.

Figure 1:
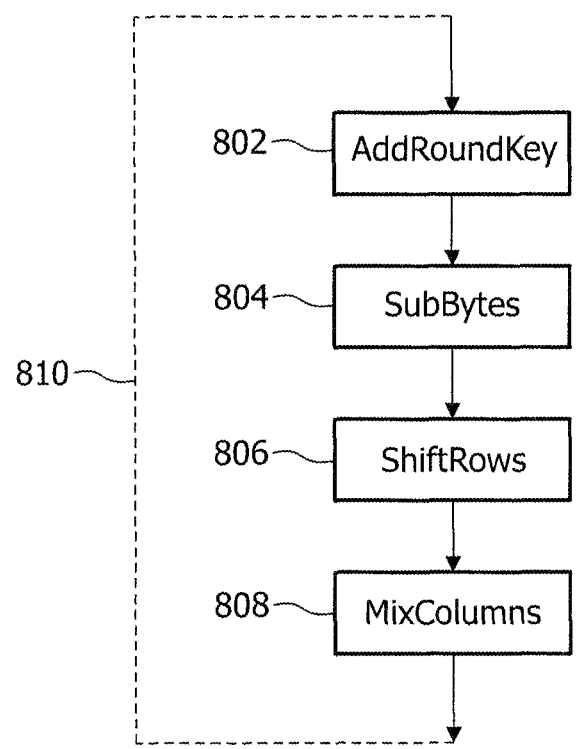
FIG. 1 is a diagram illustrating operations in a round of AES.

FIG. 1 illustrates some main processing steps of a round of AES. The processing steps include:

AddRoundKey 2—each byte of the state is XOR'ed with a byte of the round key.

SubBytes 4—A byte-to-byte permutation using a lookup table.

ShiftRows 6—Each row of the state is rotated a fixed number of bytes.

MixColumns 8—Each column is processed using a modulo multiplication in $GF(2^8)$.

The steps SubBytes 4, ShiftRows 6, and MixColumns 8 are independent of the particular key used. The key is applied in the step AddRoundKey 2. Except for the step ShiftRows 6, the processing steps can be performed on each column of the 4×4 state matrix without knowledge of the other columns. Therefore, they can be regarded as 32-bit operations as each column consists of 4 8-bit values. Dashed line 10 indicates that the process is repeated until the required number of rounds has been performed.

Each of these steps or a combination of steps may be represented by a lookup table or by a network of lookup tables (S-boxes). If the AddRoundKey step were implemented by XOR'ing with the round key, then the key is visible to the attacker in the white-box attack context. The AddRoundKey step can also be embedded in lookup tables, which makes it less obvious to find out the key. In fact, it is possible to replace a full round of AES by a network of lookup tables. For example, the SubBytes, ShiftRows, and MixColumns steps may be implemented using table lookups. Below we will discuss a possible white-box implementation of AES more fully.

Figure 2:
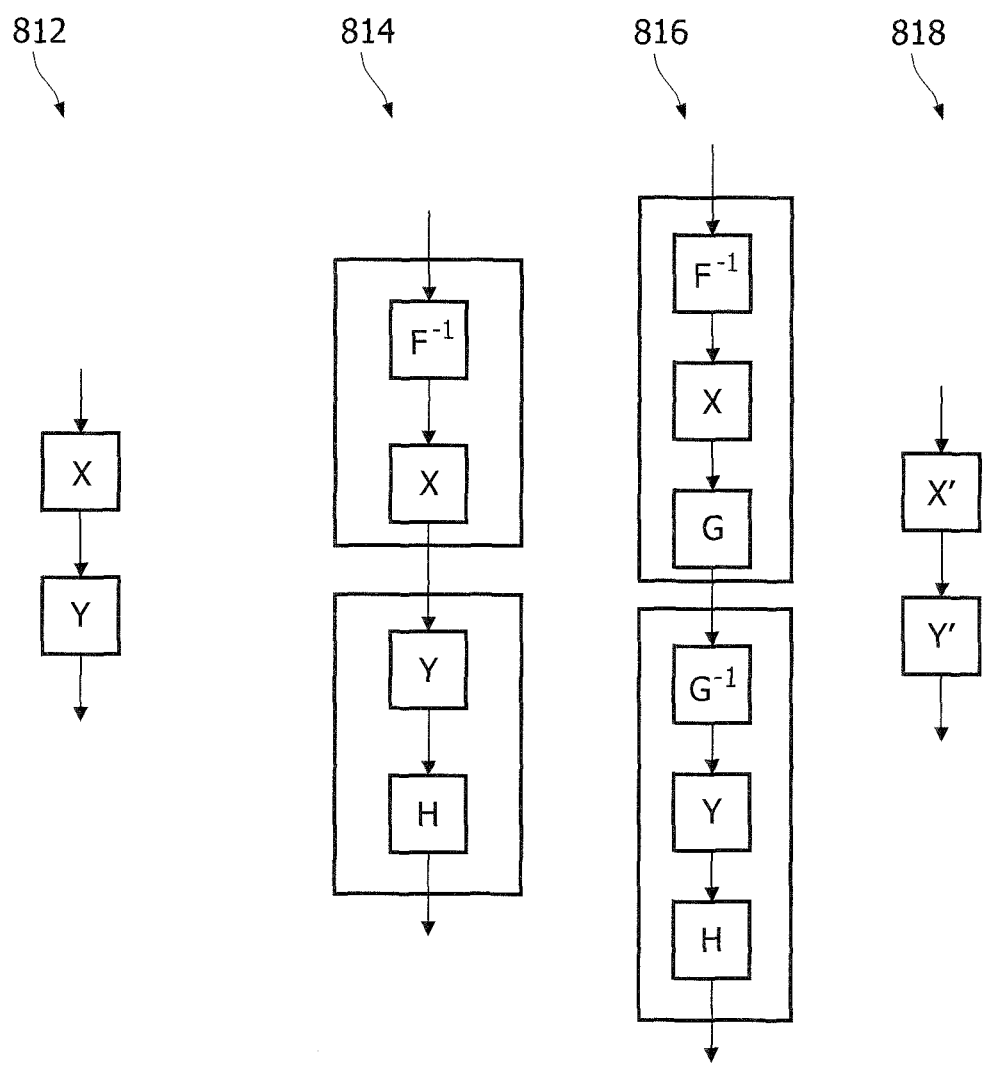
FIG. 2 is a diagram illustrating an example of obfuscating tables.

FIG. 2 illustrates a way to make it even more difficult to extract the key. After a cryptographic operation, such as an AES encryption, has been transformed into a network of basic operations, further obfuscation is possible. Let X and Y be two functions, i.e., basic operations. Consider the composite operation $Y \circ X = Y(X(c))$, illustrated as diagram 12, that is, to obtain the composite operation, Y is performed after X. Here c is an input value, for example a 4-byte state column. However, the approach applies to any type of input value c. Mappings X and Y can be implemented as look-up tables which can be stored in memory, however, when they are stored in memory the values can be read by an attacker. Diagram 14 illustrates how the contents of the look-up tables can be obfuscated by using an input encoding F and an output encoding H. Look-up tables corresponding to $X \circ F^{-1}$ and $H \circ Y$ are stored as illustrated instead of X and Y, making it more difficult to extract X and Y. Diagram 16 shows how to add an additional, for example random, bijective function G, such that the intermediate result of the two tables is also encoded. In this case, two tables are stored in memory: $X' = G \circ X \circ F^{-1}$ and $Y' = H \circ Y \circ G^{-1}$. This is illustrated once more in diagram 18:

$$Y \circ X' = (H \circ Y \circ G^{-1}) \circ (G \circ X \circ F^{-1}) = H \circ (Y \circ X) \circ F^{-1},$$

where $\circ$ denotes function composition as usual (i.e., for any two functions $f(\chi)$ and $g(\chi)$, $f \circ g(\chi) = f(g(\chi))$ by definition), X and Y are functions suitable for implementation by means of look-up tables. Likewise a network consisting of more than two functions can be encoded. The actual tables encoding X and Y are obfuscated by combining $H \circ Y \circ G^{-1}$ in a single look-up table and combining $G \circ X \circ F^{-1}$ in a single look-up table. As long as F, G, and/or H remain unknown, the attacker cannot extract information about X and/or Y from the look-up tables, and hence the attacker cannot extract the key that is the basis for X and/or Y. Other cryptographic algorithms, including DES and Rijndael (of which AES is a particular instantiation), may also be encoded as a (cascade or network of) look-up tables that may be obfuscated in a way similar to the above. The invention is not limited to the exemplary cryptographic algorithms mentioned.

Chow 1 discloses a method with the intent to hide the key by encoding its tables with random bijections representing compositions rather than individual steps. Preventing secret-key extraction has the advantage that an attacker is prevented from extracting keying material which would allow software protection goals to be bypassed on other machines, or from publishing keying material effectively creating 'global cracks' which defeat security measures across large user-bases of installed software. It provides an increased degree of protection given the constraints of a software-only solution and the hostile-host reality. In the approach of Chow 1, the key is hidden by (1) using tables for compositions rather than individual steps; (2) encoding these tables with random bijections; and (3) extending the cryptographic boundary beyond the crypto algorithm itself further out into the containing application, forcing attackers (reverse engineers) to understand significantly larger code segments to achieve their goals. Chow 1 discusses a fixed key approach: the key(s) are embedded in the implementation by partial evaluation with respect to the key(s), so that key input is unnecessary. Partial evaluation means that expressions involving the key are evaluated as much as reasonably possible, and the result is put in the code rather than the full expressions.

A possible attack-scenario is for an attacker to extract a key-specific implementation and use it instead of the key. This problem can be mitigated by designing the key-specific implementation tailored to function as a component of a larger containing system. The larger system can be arranged to provide the component with input in a manipulated or encoded form. When the key-specific implementation is removed by an attacker and inserted in a different larger system, the key-specific implementation will not function properly since the different larger system will not provide its input in the manipulated form expected by the key-specific implementation.

Referring to the step of encoding tables, since encodings are arbitrary, results are meaningful only if the output encoding of one step matches the input encoding of the next. For example, if step X is followed by step Y (resulting in computation of $Y \circ X$), the computation could be encoded as $$Y' \circ X' = (H \circ Y \circ G^{-1}) \circ (G \circ X \circ F^{-1}) = H \circ (Y \circ X) \circ F^{-1}.$$

This way, $Y \circ X$ is properly computed albeit that the input needs to be encoded with F and the output needs to be decoded with $H^{-1}$. The steps are separately represented as tables corresponding to Y' and X', so that F, G, and H are hidden as well as X and Y.

Apart from such confusion steps, Chow 1 uses diffusion steps by means of linear transformations to further disguise the underlying operations. The term mixing bijection is used to describe a linear bijection, used in the above sense. The implementation of Chow 1 takes input in a manipulated form, and produces output in a differently manipulated form, thereby making the white-box AES implementation difficult to separate from its containing application.

Chow 2 discusses a cryptographic implementation of DES designed to withstand white-box attacks that aim at extracting secret keys from the program. The techniques discussed in this paper about obfuscating look-up table networks apply for a large part also to other cryptographic algorithm including AES and others. While an attacker controlling the execution environment can clearly make use of the software itself (e.g. for decryption) without explicitly extracting the key, forcing an attacker to use the installed instance at hand is often of value to digital rights management (DRM) systems providers. In general, the approach in Chow 2 is to work towards an implementation consisting entirely of substitution boxes, none of which implement affine transformations. A number of techniques, described in Chow 2, support the general approach. Some of these techniques are I/O-blocked encoding, combined function encoding, by-pass encoding, split-path encoding, and output splitting.

Partial evaluation means that expressions based on values (partially) known at the time of implementation are pre-evaluated. In a simplified example, when the key is '5', and the original implementation contains the expression '2*key', then rather than incorporating '2*5' in the implementation, the pre-evaluated expression '10' is put in the implementation. This way, the key '5' is not directly present in the code. In the case of DES with a fixed key, this involves replacing standard S-boxes with key-specific pre-evaluated S-boxes, e.g., computed from the key at or before compilation time. A mixing bijection according to Chow 2 is a bijective linear transformation designed such that each output bit depends on a large number of input bits. I/O-blocked encoding is an encoding method for handling large numbers of input and output bits. In this case, the encoding/decoding can be formed as a concatenation of encodings, where each encoding deals with a subset of the input/output bits. Combined function encoding means that if two or more operations can be processed in parallel, a single encoding function is applied to the concatenation of the inputs (respectively outputs) of the parallel operations. It is more or less the opposite of I/O-blocked encoding. By-pass encoding means that the encoding transformation adds a number of superfluous bits of entropy to the input and/or output of the transform to be obfuscated, and redesign the transform to be obfuscated to "by-pass" the superfluous bits such that they do not affect the final output of the procedure. Split-path encoding means that a function is modified to provide additional output bits for obfuscating the essential information bits. Output splitting means that the output of a function is distributed over several partial functions, where the output of all partial functions must be combined, preferably in a non-obvious way, in order to obtain the original output of the function.

Chow 2 proposes building encoded networks to construct S-boxes with wide input of, say, 32 bits or even 96 bits. Such a wide-input S-box is divided into a network of S-boxes each having a more narrow input and output; each of the S-boxes is encoded by incorporating an encoding function in the S-box. The inverse of the encoding function is incorporated in the S-box processing the output of the S-box.

To improve to clarity of the exposition, we will first describe a possible white-box implementation of a block cipher, in this case AES. Below we will indicate a problem with this implementation and how it may be rectified. It is noted, that the problem the invention seeks to solve is not just restricted to the particular implementation given below, but is endemic to white-box implementations in general. We refer to Chow 1, in particular section 2.2 to section 3.6, for more details on known white-box implementations.

A White-box AES implementation can be sketched as follows. The input to the AES encryption and decryption algorithm is a single 128-bit block. This block is represented by a 4×4 matrix consisting of 16 bytes. AES usually consists of 10 rounds for AES-128. Each round updates a set of sixteen bytes which form the state of AES, thus each AES round processes 128 bits. AES-128 uses a key of 128 bits. This key serves as input for an algorithm which converts the key into different round keys of 128 bits. A basic round consists of four parts:

SubBytes
ShiftRows
MixColumns
AddRoundKey.

This order of operations applies to AES encryption. Although the standard order of operations in AES decryption is different, it is possible to rewrite the AES decryption algorithm to have the same order of operations as for AES encryption.

Before the first round, an extra AddRoundKey operation occurs, and from round ten the MixColumns operation is omitted. The only part that uses the key is AddRoundKey, the other three parts do nothing with the key. In the implementation the boundaries of the rounds are changed to integrate the AddRoundKey step and the SubBytes step of the next round into one step. A round begins with AddRoundKey and SubBytes followed by ShiftRows and finally MixColumns.

First, the key is hidden by composing the SubBytes step and the AddRoundKey together into one step. This makes the key no longer visible on its own. Because the key is known in advance, the operations involving the key can be pre-evaluated. This means that the standard S-Boxes which are used in the step SubBytes can be replaced with key-specific S-Boxes. To generate key-specific instances of AES-128, the key is integrated into the SubBytes transformations by creating sixteen 8×8 (i.e. 8-bit input, 8-bit output) lookup tables $T_{i,j}^r$ which are defined as follows:

$$T_{i,j}^r(\chi)=S(\chi \oplus k_{i,j}^{r-1}), i=0,\ldots,3; j=0,\ldots,3;$$
$$r=1,\ldots,9,$$

where S is the AES S-box (an invertible 8-bit mapping), and $k_{i,j}^r$ is the AES sub-key byte at position i, j of the 4×4 matrix which represents the round key for round r. These T-boxes compose the SubBytes step with the previous round's AddRoundKey step. The round 10 T-boxes absorb the post-whitening key as follows:

$$T_{i,j}^{10}(\chi)=S(\chi \oplus k_{i,j}^9) \oplus k_{sr(i,j)}^{10}, i=0,\ldots,3;$$
$$j=0,\ldots,3,$$

where sr(i, j) denotes the new location of cell i, j after the ShiftRows step. The total number of T-boxes is 10×16=160. However, the key can easily be recovered from T-boxes because $S^{-1}$ is publicly known. This makes additional encodings necessary.

Linear transformations are used for diffusing the inputs to the T-boxes. These linear transformations are called mixing bijections and can be represented as 8×8 matrices over GF(2). The mixing bijections are inverted by an earlier computation to undo their effect.

Figure 3:
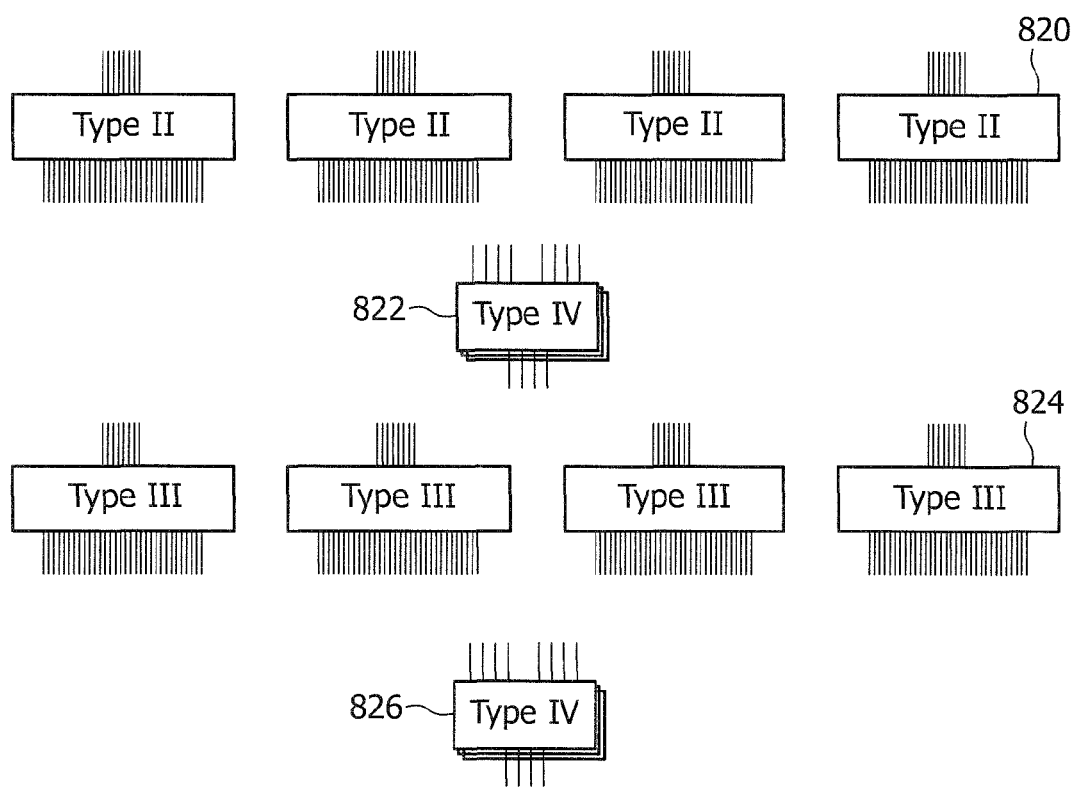
FIG. 3 is a diagram illustrating a round for a column in a white-box AES implementation.

FIG. 3 illustrates the tables involved in a round of white-box AES for one 32-bit column of the state (after applying ShiftRows). The names of the different types of tables are introduced here. They are discussed in more detail hereinafter. Before the rounds, each byte of the 128-bit state is applied to a respective type Ia table. This results in respective 128-bit values which are XOR'ed using a network of type IV tables to provide a 128-bit output that is divided into four 32-bit values. The processing steps of each 32-bit value are outlined here. The four bytes of the 32-bit value are input to four respective type II tables 20. Each of the four type II tables 20 result in a 32-bit output. These outputs are bitwise XOR'ed using type IV tables 22. Each type IV table 22 performs a 4-bit bitwise XOR. By properly connecting inputs and outputs of type IV tables, the bitwise XOR of the four 32-bit outputs can be realized as will be understood by the skilled artisan. The result of this step is a 32-bit value. Each of the four bytes of this value is applied to a respective type III table 24. Each type III table provides a 32-bit output. These outputs are again bitwise XOR'ed using a network of type IV tables 26 similar to the network of type IV tables 22. The output is a 32-bit value indicative of a column of the state. This is repeated for each round.

After the rounds have been performed for each of the four 32-bit values, the outputs are combined into a 128-bit value. Each byte of the 128-bit value is applied to a type Ib table; the results are XOR'ed using a network of type IV tables.

Figure 4:
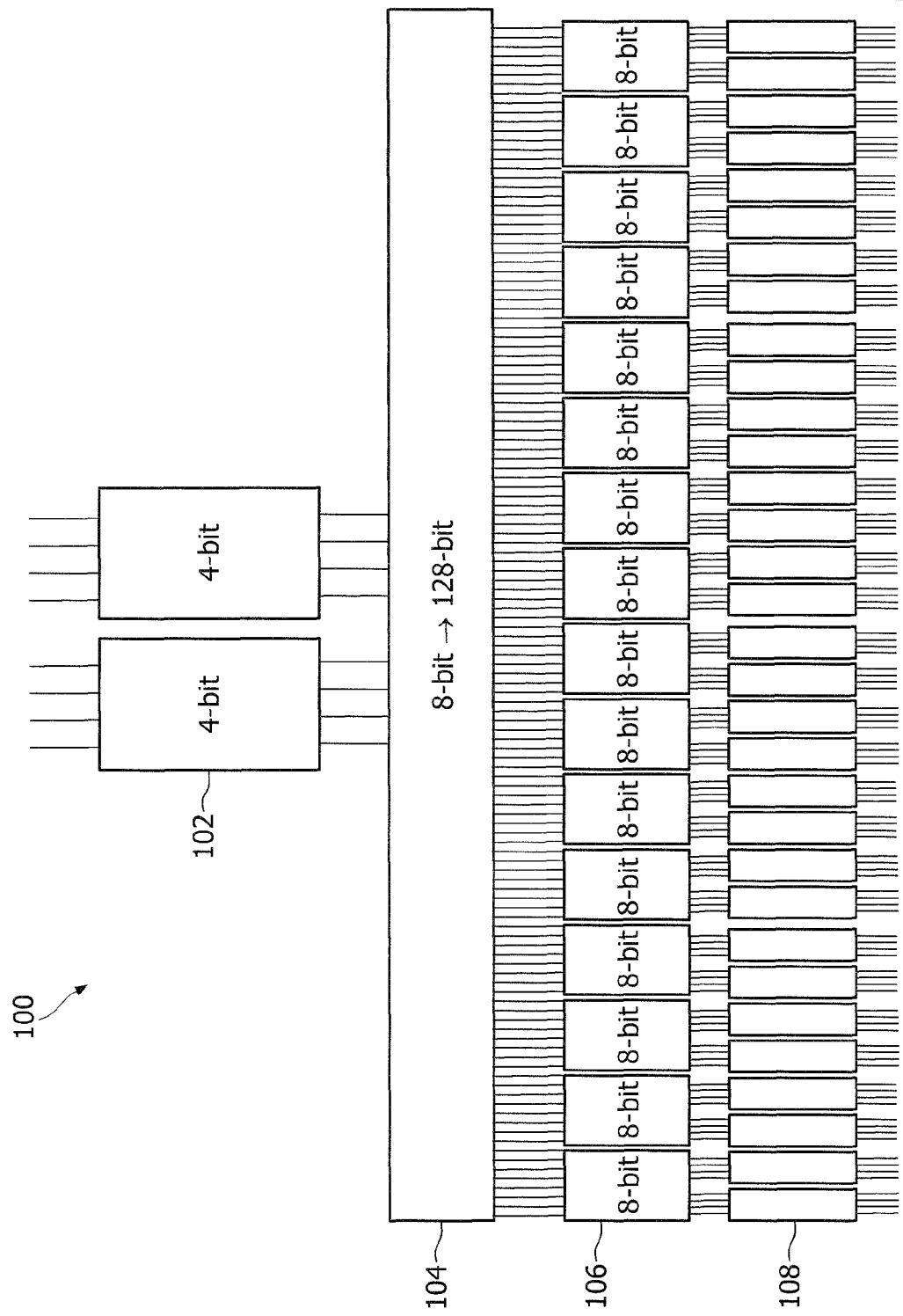
FIG. 4 is a diagram illustrating mappings incorporated in a type Ia table.
Figure 5:
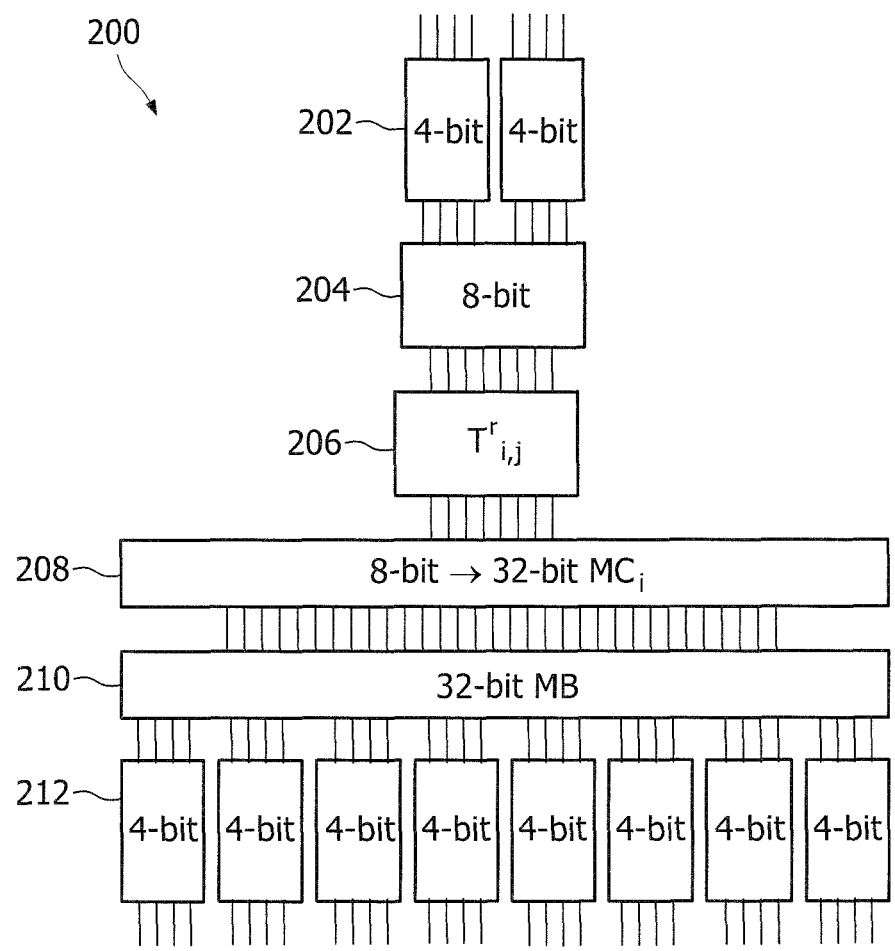
FIG. 5 is a diagram illustrating mappings incorporated in a type II table.
Figure 6:
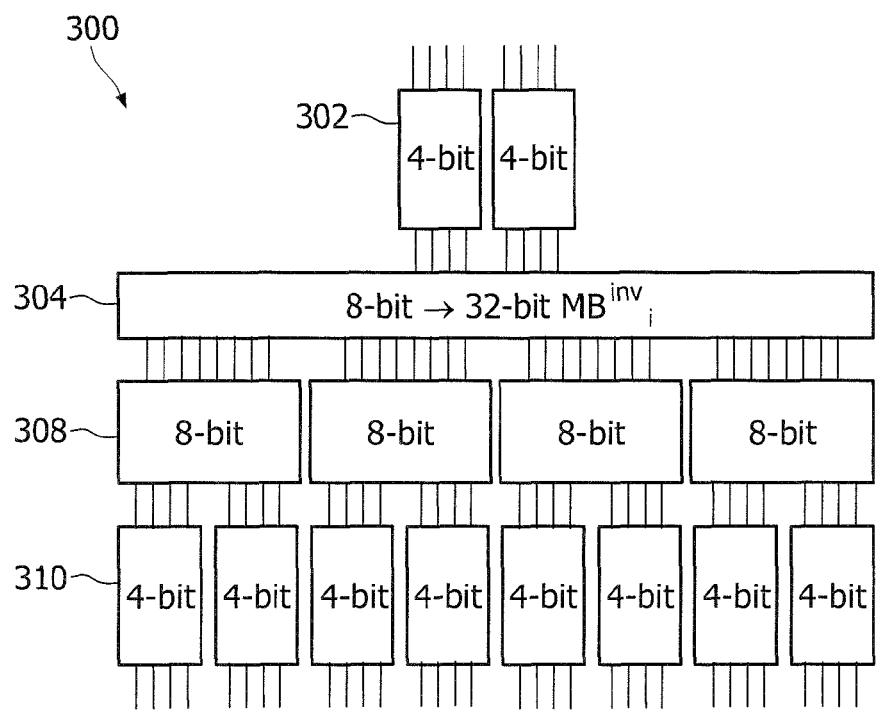
FIG. 6 is a diagram illustrating mappings incorporated in a type III table.
Figure 7:
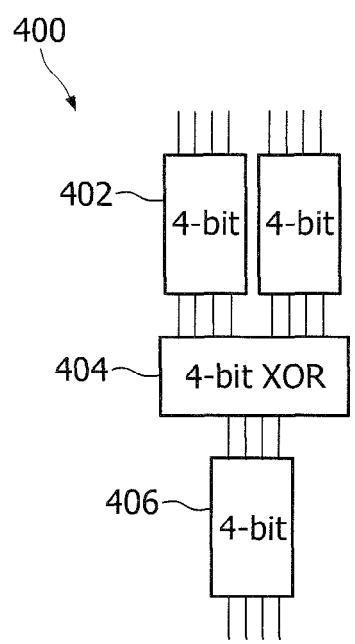
FIG. 7 is a diagram illustrating mappings incorporated in a type IV table.
Figure 8:
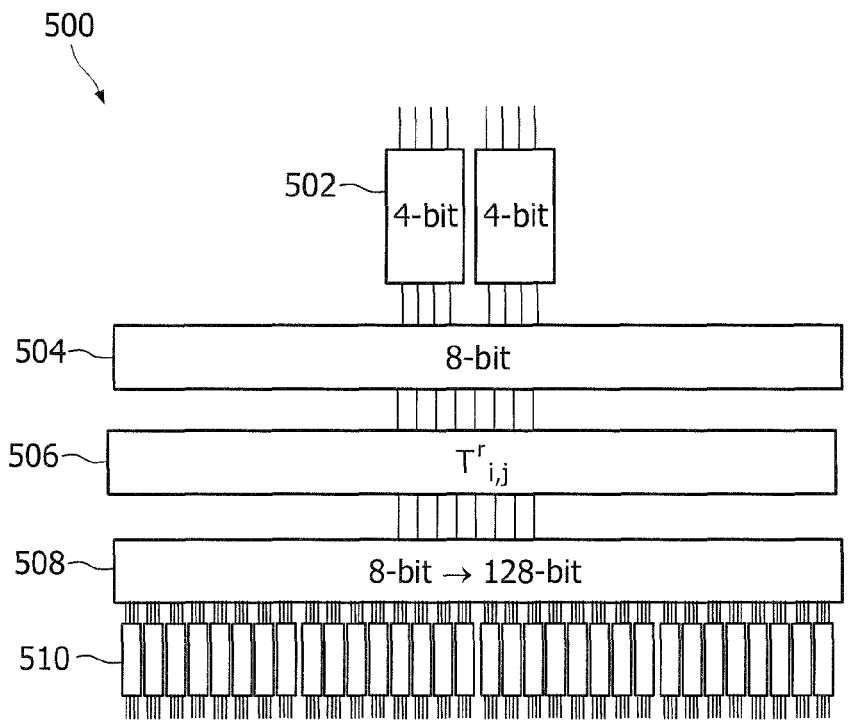
FIG. 8 is a diagram illustrating mappings incorporated in a type Ib table.

FIG. 4 illustrates a type Ia table 100. FIG. 5 illustrates a type II table 200. FIG. 6 illustrates a type III table 300. FIG. 7 illustrates a type IV table 400. FIG. 8 illustrates a type Ib table 500.

The mixing bijections are used as follows. An AES state is represented by a 4×4 matrix consisting of bytes. The MixColumns step operates on a column (four 8-bit cells) at a time. Consider a 32×32 matrix MC. If this is represented by a table, this table would cost $2^{32} \times 32 = 137438953472$ bits=16 GB. In order to avoid such large tables the matrix is blocked into four sections.

MC is blocked into four 32×8 sections, MC0, MC1, MC2, MC3 (block 208). Multiplication of a 32-bit vector x=(x0, ..., x31) by MC is done by dividing the bits of x into four bytes and multiplying each of the sections of MC with one of the bytes, yielding four 32-bit vectors (z0, ..., z3). This is followed by three 32-bits XORs giving the final 32-bit result z. The four tables together only cost $4 \times 2^8 \times 32 = 32768$ bits=4 KB.

The three XORs will be divided into 24 4-bit XORs, each represented by a possibly encoded look-up table, with appropriate concatenation (e.g. ((z[0, 0], z[0, 1], z[0, 2], z[0, 3])+(z[1, 0], z[1, 1], z[1, 2], z[1, 3]))||((z[0, 4], z[0, 5], z[0, 6], z[0, 7])+(z[1, 4], z[1, 5], z[1, 6], z[1, 7]))||...), where || denotes concatenation and + denotes XOR. By using these strips and subdivided XORs, each step is represented by a small lookup table. In particular, for i=0, ..., 3 the zi are computed using 8×32-bit tables. An 8×32-bit table has an 8-bit input and a 32-bit output. Such a table may be implemented by listing $2^8$ output values of 32 bit each. The 4-bit XORs become 24 8×4-bit tables. FIG. 7 illustrates how input decodings 402 and output encodings 406 can be put around the XORs 404. These encodings are usually randomly chosen non-linear 4×4 bijections. The XOR tables are called type IV tables 400. The type IV tables take as input 4 bits from each of two previous computations. The output encodings 212 of those computations are matched with the input decodings 402 for the type IV tables to undo each other. The choice for 4×4 non-linear bijections depended on the size of the tables. In this situation a type IV table is only $2^8 \times 4$ bits=128 bytes. 24 tables are needed which cost together 3 KB. If the XORs were not divided, three XOR tables would be needed which computed 32-bit XORs. The T-boxes 206 and the 8×32-bit tables 208 could be represented as separate lookup tables. Instead, they can be composed creating new 8×32-bit tables 200 computing the SubBytes and AddRoundKey transformations as well as part of MixColumns. This saves both space (to store the T-boxes) and time (to perform the table lookups).

Before splitting MC into MCi as above, MC will be left-multiplied by a 32×32 mixing bijection MB, illustratively indicated in FIG. 5 at reference numeral 210, chosen as a non-singular matrix with 4×4 sub-matrices of full rank. The use of mixing bijections increases the number of possible constructions for a particular table.

FIG. 5 illustrates an 8×32 type II table 200 including 4×4 input decodings 202 and 4×4 output encodings 212. These output encodings and input decodings are non-linear 4×4 bijections which must match the input decodings and output encodings of the type IV tables 400. The type II tables 200 are followed by type IV tables 400. In order to invert MB, an extra set of tables is used for calculating $MB^{-1}$. Let $(x'_0, ..., x'_{31})$ be the input to MixColumns, and let $(z_0, ..., z_{31})$ be the output after MixColumns. Let $(z'_0, ..., z'_{31})^T$ be the result after multiplication with MB. $(z'_0, ..., z'_{31})^T$ serves as input to the type III tables 300. Note that the input decodings and the output encodings need not be considered here because the output encoding of a table is undone by the input decoding of a next table. In the type III tables 300, $MB^{-1}$ is applied 304 and the inverses 308 of the four input mixing bijections 204 of the next round's four type II tables 200.

FIG. 6 illustrates an 8×32 type III table 300 including 4×4 non-linear input decodings and 4×4 non-linear output encodings. These tables are followed by corresponding type IV tables 400.

One round of data operations involves an operation on a 128-bit state matrix. The data operations performed on each of four strips of 32 bits of the 128-bit state matrix is as follows. The 32-bit strip is divided into four 8-bit bytes. Each of the four bytes is fed into a distinct type II table 200, resulting in four 32-bit output values. These values have to be XOR'ed using obfuscated type IV tables 400. To that end, each 32-bit output value is divided into eight 4-bit nibbles, and appropriate pairs of nibbles are input to respective type IV tables, such that the XOR of the four 32-bit output values is obtained in encoded form.

This 32-bit resulting encoded XOR'ed result is again divided into bytes, and each byte is input to a distinct type III table 300. The input decoding of each nibble of the type III tables corresponds to the output encoding of the last applied type IV tables. The type III tables again result in four 32-bit output values that are again XOR'ed using obfuscated type IV tables 400.

In summary, the rounds are implemented by lookup tables. The lookup tables of a single round are networked as follows. The data is fed into Type II tables. The output of these tables is fed to a network of Type IV tables representing encoded XORs. The output of this network is fed to Type III tables canceling the mixing bijection encoding that is inserted by the Type II tables. The encoded output of the round is finally derived by feeding the output of the Type III tables into, again, a network of Type IV tables representing encoded XORs.

Furthermore, the white-box implementation contains Type I tables at the beginning (type Ia table 100) and the end (type Ib table 500) for respectively canceling out and inserting external encodings. The type Ia table 100 can be used to apply a concatenation of mappings as illustrated in FIG. 4 by applying a single table look-up. In the concatenation, a 4-bit nibble input decoding 102 appears first. Then, an 8-bit to 128-bit mapping 104 appears; this mapping is part of an encoding of the input and output of the network; this mapping can be undone elsewhere in the program. Apart from the linear 8 bit to 128 bit mapping, also other tables may be part of the external encoding. For example, if Table 100 is comprised in the first round, then 102 may be included. Similarly, if Table 100 is in the last round 106 en 108 may be included. The result of mapping 104 is split in 16 eight-bit pieces to which respective 8-bit bijections 106 are applied. Finally, the output nibble encoding 108 is applied. As mentioned, the cascade of mappings 102, 104, 106, and 108 is pre-evaluated and the final result is tabulated in a look-up table. This results in a table with at most 256 entries of 128 bits each. The concatenation of mappings incorporated in a type Ib table 500 is schematically displayed in FIG. 8. The first mapping is the input nibble decoding 502, which is followed by an 8-bit bijection 504, a T-box$_{i,j}^r$ 506, where r corresponds to the last round, an 8-bit to 128 bit mapping for providing output encoding, and output nibble encodings 510. The 128-bit output of this kind of table is XOR'ed with the output of other type Ib tables, again making use of nibble input and output encoded type IV tables 400. The output encoding 508 is undone elsewhere in the program, i.e., outside the cryptographic part of the program. This makes it more difficult for an attacker to break the encodings of the tables by analyzing only an input and an output of the cryptographic part of the program.

Hereafter, an improved white-box implementation of AES is described.

White-box techniques, such as described, e.g., in Chow 1 and Chow 2 can be combined with each other in various ways to obtain white-box implementation of a wide variety of cryptographic operations, including block-ciphers, streams ciphers, message authentication codes (MAC), etc. However, as described in Michiels 1, such white-box implementations share a fundamental weakness. When the input bytes of the various intermediate rounds are obfuscated using techniques such as those found in Chow 1 and 2, there will be, for each of the input bytes, a relation mapping that input byte to an input byte of a straightforward, non-white-boxed implementation of AES. Were this relation known then this would compromise the security in WBAC of the white-box implementation. To practitioners in the art of cryptography, it is known that knowledge of input bytes to intermediate rounds of AES may reveal the cryptographic key. Especially, early and/or late rounds in a block cipher are particularly vulnerable to the exposure of internal data. As it turns out, however, just the mere fact that such a relationship exists is already sufficient to mount an attack. Moreover, as shown in Michiels 1 this property is not specific to the AES or DES implementation shown by Chow, or in this document, but is in fact unavoidable in many cryptographic operations which can be expressed as an substitution-affine-transformation cipher.

In overview, the improvement is achieved as follows. It was an insight of the inventor that is must be avoided that the intermediate data is obfuscated with a fixed encoding while it flows out of the first round and into the next. This is achieved by encoding according to an encoding scheme which varies with the input to the white-box implementation. For the sake of readability we explain the improved white-box techniques with respect to AES and not in terms of an arbitrary substitution-affine transformation cipher.

Figure 9:
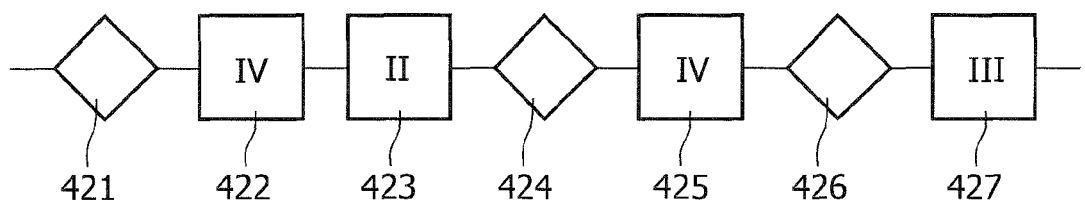
FIG. 9 is a diagram illustrating a white box implementation using encoding.

In FIG. 9, part of a white box implementation of AES is schematically illustrated. Shown is a type IV block 422, a type II block 423, a type IV block 425 and a type III block 427, these blocks operate on data one after the other, starting with block 421. In FIG. 9, the type of the basic block is indicated with a roman numeral. This sequence of operations can be found in the white box implementation described above multiple times, for example starting after the first Type III operation. Between the blocks, encoding, recoding and decoding steps are inserted. Note that in practice there may be multiple basic blocks operating in parallel. For example, in an AES embodiment, 16 Type II look-up tables are summarized in the single type II block 423 shown in the figure. Similarly, the outputs of these Type II tables are combined in an XOR network 425, which combines 24 type IV look-up tables.

Before the type IV block 422, i.e., an XOR network, an encoder 421 is placed, which encodes data using a selected encoding scheme. The encoding scheme is selected out of a plurality of encoding using a selection value, which depends on the input to the white-box implementation. For example, the selection value may be based on a cryptographic hash of the input, say, the first number of bits, say the first 4 bits. However the selection value may also be chosen as the input to the encoder itself. Preferably, the selected encoding is chosen such that the XOR network respects the encoding. That is, the outputs of XOR network 422, are still encoded according to the encoding. For example, this may be achieved by using affine encodings. Note also that some ciphers may not use an XOR operation at all, at least not in this place. In such situations other encodings may be selected as can be determined by a person skilled in the art.

Although encoder 421 could have been placed immediately before type II basic block 423, having a basic block, e.g. block 422, between encoder 421 and type II basic block 423 is an advantage as it makes it harder for an attacker to locate and analyze the type of encodings used in the implementation. Moreover, in the placing shown in FIG. 9, the encoding is embedded in a round of the block cipher. It is considered harder to analyze rounds than to analyze the transition between rounds.

The encoded data is then operated upon by the T box, Type II block 423. Since the T-box was constructed in dependence on the AES S-box, it is not linear and would normally not respect an encoding applied by encoder 421. Accordingly, the output of Type II block 423 is encoded with a different encoding. Typically, the different encoding would be a highly non-linear encoding. Moreover, recall that outputs of multiple blocks 423 must be combined in the XOR network type IV block 425. Different T-boxes can give rise to different encodings. To this end a compensator 424 is placed between type II block 423 and the XOR network, type IV block 425. Compensator 424 compensates for the effect of block 423 on the encodings and for the difference in encodings between output bytes. Preferably, compensator 424 collects output bytes which will be XOR-ed together in the following type IV block 425 and ensures that they are encoded with the same encoding, preferably an affine encoding. If the encoding, will be removed after the XOR network, as is done in this embodiment, then the encoding may be chosen arbitrarily, although preferably, affine. For example, compensator 424 may pick one of the different encodings and convert all of the other data to this encoding. Preferably, as the following block is an XOR block, compensator 424 converts into an affine encoding. Optionally, compensator 424 may select an altogether new encoding for its encodings, instead of picking one of the different encodings. Also this new encoding could be selected input dependently out of a further plurality of encodings. Optionally, compensator 424 may remove all encodings.

After XOR network 425, a type III operation may be done to undo a mixing bijection that was introduced into the Type II tables, used in blocks 423. To prepare the data before block 427, a decoder 426 removes the encoding introduced by compensator 424 and/or block 423 and/or block 421. Note that, in general, a mixing bijection is optional, it being merely one way to further complicate the performing of the cryptographic operation. If no mixing bijection was introduced into the tables of block 423 then block 427 may be omitted. Also decoder 426 may then be omitted. Optionally, decoder 426 may be included in the last round.

To simplify the work of compensator 424 a self-equivalent encoding scheme can be used by encoder 421. In particular, an encoding placed on an input to block 423 is transformed into a regular output albeit encoded according to an output encoding scheme. The output encoding scheme belongs to the same type of encoding as the input. In particular, there are self-equivalent affine encodings, which when placed on input data give rise to a affine output encoding. Such self-equivalent encodings are relatively rare, as block 423 incorporates a non-linear S-box. However, it is known from the paper Biryukov 1 that such self-equivalent affine encodings exists. Note in particular Section 4 and 5 of that paper. In particular, for the S-box of AES 2040 self-equivalent affine encodings exist.

Note that operations may be done, at least partially, in parallel, in so far data dependency allows.

DETAILED DESCRIPTION OF THE IMPROVED WHITE-BOX IMPLEMENTATION

We continue with a more detailed description of an embodiment of a white-box implementation.

The beginning of an AES-round is as follows. The input to the round is split into bytes. Each byte i is XORed with a byte $k_i$ of the round key. The result of this XOR is used as input to an S-box. In the construction of a white-box implementation, these two operations are merged into a single so-called T-box operation. This means that for each input byte i to the round we define an 8-to-8-bit bijective mapping $T_i$ by $T_i(x)=S(x \oplus k_i)$.

Note that other ciphers may not use bytes, or even nibbles, as the most basic unit of information, the approach given here for AES remains applicable, although dimensions must be changed accordingly. As noted, this T box operation is preferably not used in isolation, but is integrated with other operations. Also, non-linear obfuscating functions may have been inserted, as explained for FIG. 2.

In the construction of a white-box implementation, this T-box is implemented by a lookup table. The lookup table not only implements the T-box operation, but a function $U_i(\chi) = a_2 \circ T_i \circ a_1^{-1}$, where $a_1$ is a bijective 8 to 8-bit mapping and $a_2$ is a 8 to m bit mapping that is not necessarily bijective. In the preceding description, using the terminology of Chow 1, $U_i$ can be regarded as a type II table with m=32. It is noted however, that the invention may be applied more generally to basic operations having a self-equivalent encoding. This brings us to the following property of a white-box implementation. It is this property that is exploited by the attack presented in Michiels 1.

Property: Let I be a standard reference implementation of AES for some given key, and let WB be a white-box version of implementation I. Furthermore, let b be an input byte of a round in I. Then, a fixed function $a_1$ exists, such that WB derives the value $a_1(b)$. This function $a_1$ is fixed and does not depend on (is not parameterized by) the input given to the implementation. We note that the function $a_1$ can be different for different input bytes. Note that $a_1$ does depend on the particular white-box implementation.

In a white-box implementation according to the invention this relation between a standard implementation and the white-box implementation is broken.

As indicated above, a white-box AES implementation according to Chow et al. contains a lookup table that implements the function $U_i(\chi)=a_2 \circ T_i \circ a_1^{-1}$. For some particular choice of $a_1$ and $a_2$. Let $V_i$ be a set of function-pairs $(\alpha, \beta)$ such that $U_i = \beta \circ U_i \circ \alpha^{-1}$, and let $W_i = \{\alpha | \exists_\beta (\alpha, \beta) \in V_i\}$. Then, for any $(\alpha, \beta) \in V_i$ we have that if we provide the lookup table for $U_i$ with an input encoded by $\alpha$, then this results in an output encoded by $\beta$. Preferably, the input of the lookup table for $U_i$ is therefore encoded with an encoding from $W_i$, where the selected encoding need not be the same for all inputs of the white-box implementation.

White-box implementations as proposed by Chow 1 contain two types of encodings: linear encodings and non-linear encodings. The construction of the white-box implementation can be divided into two steps. In the first step, a white-box implementation is constructed that only contains linear encodings, and in the second step the non-linear encodings are added. In this embodiment, we take the white-box implementation derived after the first step as our starting point. Hence, in the discussion, we can assume that no non-linear encodings are applied. Non-linear encodings may be applied afterwards, if so desired.

In the white-box implementation, the T-box is contained in an 8 to 32-bit table, this table is referred to as Type II table. If we split this table into four 8 to 8 bit tables, then the function implemented by the $j^{th}$ table can be written as $U_{i,j} = f_{i,j} \circ T_i \circ g_i^{-1}$, where $g_i$ and $f_{i,j}$ are linear functions. Function $g_i$ is bijective and by choosing the linear encodings properly, we can also ensure that $f_{i,j}$ is bijective. We will assume in this embodiment that they are both bijective.

The lookup table implementing $U_{i,j}$ is followed by lookup tables that implement XORs, that is, the output of Type II tables is further processed by Type IV tables. More precisely, the XOR tables compute the following. The set of 16 T-boxes are partitioned into 4 sets of 4 T-boxes (T-boxes are in the same set if they are associated to bytes from the same column after the ShiftRows step of AES). Let $\{i_1,i_2,i_3,i_4\}$ be such a set, and let $y_{i,j}$ be the outcome of function $U_{i,j} = f_{i,j} \circ T_i \circ g_i^{-1}$. Then, the XOR tables compute for each j=1,2,3,4 the XOR of the values $y_{i_1,j}, y_{i_2,j}, y_{i_3,j}, y_{i_4,j}$.

The lookup table implementing $U_{i,j}$ is also preceded by lookup tables that implement XORs. Let $\chi_i$ be the input to function $U_{i,j}$. Then, the XOR tables preceding $U_{i,j}$ compute the byte $\chi_i$ from 4 bytes $\chi_{i,1}, \chi_{i,2}, \chi_{i,3}$, and $\chi_{i,4}$.

Note that, as we apply our invention on $U_{i,j}$ instead of $U_i$, we need to add the dependency on j in the index of the sets $V_i$ and $W_i$, which we defined above. As indicated, the input of the function $U_{i,j}$ is encoded by a non-constant encoding. The changes that can be made relative to the white box implementation described above relate to three issues: Which encoding do we put on the input of function $U_{i,j}$, i.e., how do we define the sets $V_{i,j}$ and $W_{i,j}$? How to put an encoding on a value? Where to put an encoding on a value? Below possible answers to each of these questions are given. This section describes which encoding is being put on the input of function $U_{i,j}$.

Let for an S-box $\hat{S}$, the set $\Phi_S$ be the set of all pairs $(\hat{\alpha}, \hat{\beta})$ of affine functions, such that $\hat{S} = \hat{\beta} \circ \hat{S} \circ \hat{\alpha}^{-1}$. Biryukov 1 gave an algorithm for deriving this set for any S-box. For the AES S-box, this set consists of 2040 pairs of functions. From this set we can easily derive for any function $U_{i,j}$ a set $V_{i,j}$ of affine function-pairs $(\alpha, \beta)$, such that $U_{i,j} = \beta \circ U_{i,j} \circ \alpha^{-1}$. Remember that $U_{i,j} = f_{i,j} \circ S \circ_{k_i} \circ g_i^{-1}$, where $f_{i,j}$ and $g_i$ are linear and bijective functions and where $\oplus_k$ denotes the function $\oplus_k(\chi) = \chi k$. To be more precise, it can be shown that the set $V_{i,j}$ given by $$V_{i,j} = \{(g_i \circ \oplus_{k_i} \circ \hat{\alpha} \circ \oplus_{k_i} \circ g_i^{-1}, f_{i,j} \circ \hat{\beta} \circ f_{i,j}^{-1}) | (\hat{\alpha}, \hat{\beta}) \in \Phi_S\}$$

has the property that for all $\alpha, \beta \in V_{i,j}$ we have $U_{i,j} = \beta \circ U_{i,j} \circ \alpha^{-1}$. The cardinality of this set is the same as for $\Phi_S$, i.e., 2040. This set $V_{i,j}$ defines the set $W_{i,j}$ of encodings that we put on the input of $U_{i,j}$. That is, the input to $U_{i,j}$ is encoded by an affine function $\alpha \in W_{i,j}$ with $W_{i,j}$ 32 $\{\alpha | \exists_\beta(\alpha, \beta) \in V_{i,j}\}$.

In this section we discuss how, in general, values may be encoded with an affine transformation. This technique may be used for the initial encoding, but also for recodings, and decodings. An encoder can encode a value in the following manner. First, we focus on linear encodings. Let v be a 4-bit selection value that is derived from the input M of the white-box implementation. The value v can for instance be a nibble of the input M. Or v can, at least partly, be derived from the value which we wish to encode, i.e., $\chi$. Furthermore, let E be a set consisting of $2^4$ linear encodings on 8 bits, i.e., E consists of $2^4$ matrices $A_1, A_2, \ldots, A_{16}$, where each matrix is an 8 by 8-bit invertible matrix. Recall, in the case of encoding, that these matrices might for example be chosen as the linear parts of the affine encodings in the set $V_{i,j}$ defined above. With slight abuse of notation, if N is a matrix, then we will also denote with N the function defined by matrix multiplication with N, i.e., N $(\chi)=N\chi$. By interpreting the value v as a number between 1 and 16, we can refer to encoding $A_v$. We now show how to implement in a white-box implementation that an 8-bit intermediate value $\chi$ is encoded by linear encoding $A_v$. Note a different cardinality for the number of encodings is possible. For example, by restricting v to a 1 bit value, only two encoding schemes are necessary.

First, we divide $\chi$ into two nibbles $\chi_1$ and $\chi_2$. Furthermore, for any $A_i$, we define $A_{i,1}$ as the matrix defined by the first four columns of $A_i$ and we define $A_{i,2}$ as the matrix defined by the last four columns of $A_i$. Then, $$A_i(\chi)=A_{i,1}(\chi_1) \oplus A_{i,2}(\chi_2).$$

Hence, we can compute $A_v(\chi)$ from $\chi$ as follows. We define an 8 to 8 bit table $\tau_1$ that maps the 4-bit values $x_1$ and v to $A_{v,1}(\chi_1)$ and we define an 8 to 8 bit table $\tau_2$ that maps the 4-bit values $x_2$ and v to $A_{v,2}(\chi_2)$. By XORing the result of these tables (e.g., via XOR tables) we get $A_v(\chi)$.

This concludes our method for putting a linear encoding on a byte $\chi$. We now discuss a similar method for putting an affine encoding on a byte. Again, the 4-bit value v is used to indicate an encoding from a set E consisting of 16 encodings. However, in this case, the set E of encodings consists of affine encodings on 8 bits, i.e., functions $\alpha(\chi)=A\chi \oplus a$, where A is an 8 by 8 bit binary matrix and a is an 8-bit constant. The encoding referred to by v is denoted by $\alpha_v(\chi)=A_v\chi \oplus a_v$.

We now proceed in the same way as for linear encodings. That is, we first divide $\chi$ into two nibbles $\chi_1$ and $\chi_2$. Furthermore, matrices $A_{i,1}$ and $A_{i,2}$ are defined as before, which means that $A_{i,1}$ denotes the matrix defined by the first four columns of $A_i$ and $A_{i,2}$ denotes the matrix defined by the last four columns of $A_i$. Then, $$A_i(\chi)=A_{i,1}(\chi_1) \oplus A_{i,2}(\chi_2).$$

Hence, we can compute $\alpha_v(\chi)$ from $\chi$ as follows. We define an 8 to 8 bit table $\tau_1$ that maps the 4-bit values $x_1$ and v to $A_{v,1}(\chi_1) \oplus a_v$ and we define an 8 to 8 bit table $\tau_2$ that maps the 4-bit values $\chi_2$ and v to $A_{v,2}(\chi_2)$. By XORing the result of these tables (e.g., via XOR tables) we get $\alpha_v(\chi)$.

Figure 10:
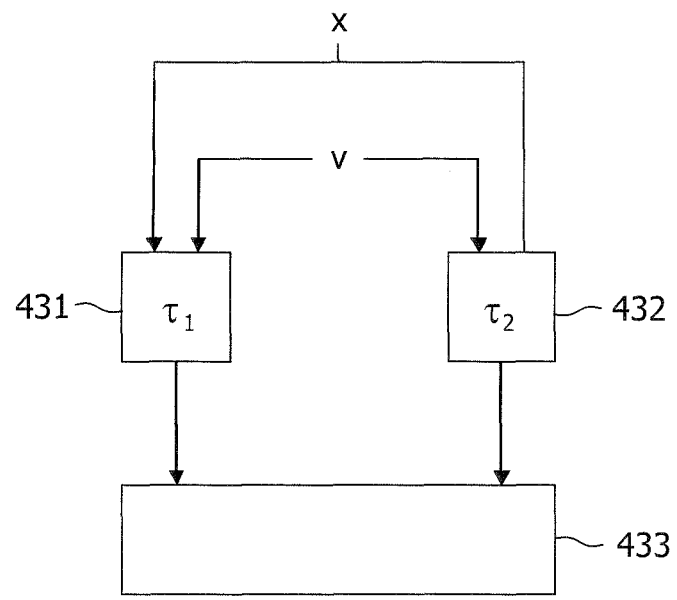
FIG. 10 is a diagram illustrating encoding.

An encoder network is illustrated in FIG. 10. The encoder network is arranged to encode the value x depending on an selection value v. Look up tables 431 is arranged to receive two 4-bit sized inputs: $x_1$ and v. It is arranged to produce one 8 bit output. Similarly, Look up tables 432 is arranged to receive two 4-bit sized inputs: $x_2$ and v, and to produce an 8 bit output. The two 8 bits values are xor-ed with each other in XOR network 433. Xor network 433 comprises two type IV tables to perform the XOR-ing and operates on the nibbles separately.

Above, we discussed how to put an encoding on a value that was not yet encoded. Now, suppose that a value $\chi$ is encoded by an encoding and that we want to change the encoding to another encoding, e.g. using a compensator 424. To make this more precise, let E and $\hat{E}$ be two, possibly different, sets that each consists of 16 affine encodings. We write $\alpha_v$ with v=1,2, . . . ,16 to refer to the encodings in E and we write $\hat{\alpha}_v$ with v=1,2, . . . ,16 to refer to the encodings in $\hat{E}$. We then consider the problem that we want to change the encoding of a byte $\chi$ from $\alpha_v$ to $\hat{\alpha}_{\hat{v}}$. This problem is the same as the problem of putting an encoding on a value that has not yet been encoded, where the encoding is taken from the set $\{\hat{\alpha}_{\hat{v}} \circ \alpha_v^{-1} | \hat{\alpha}_{\hat{v}} \in \hat{E} \wedge \alpha_v \in E\}$ consisting of $2^8$=256 encodings. Hence, we can again use the method described above. The only difference is that the 8 to 8 bit tables $\tau_1$ and $\tau_2$ now have a 12-bit input because we need 8 bits to identify an element from $$\{\hat{\alpha}_{\hat{v}} \circ \alpha_v^{-1} | \hat{\alpha}_{\hat{v}} \in \hat{E} \wedge \alpha_v \in E\}.$$

The sequel hereafter answers the question where en encoding on a value is to be put. The answer to this question is split into two parts: the introduction of the encodings and the removal of the encodings.

Introduction of the encodings:

Encodings may be introduced before a XOR network 422, some care may however be needed. For example, if affine encodings are used instead of linear encodings then not all inputs to the XOR network may encoded in the same manner. Let for any affine function $\alpha:\chi \mapsto A\chi \oplus a$, the function $\alpha^{lin}:\chi \mapsto A\chi$ be the linear part of function $\alpha$. Furthermore, let $W_{i,j}^{lin}$ be the set containing the linear parts of the affine functions in $W_{i,j}$. That is, $W_{i,j}^{lin}=\{\alpha^{lin} | \alpha \in W_{i,j}\}$. As indicated above, the input value $\chi_i$ of function $U_{i,j}$ is constructed by XORing the bytes $\chi_{i,1}, \chi_{i,2}, \chi_{i,3}$, and $\chi_{i,4}$. To put an encoding $\alpha_v$ on the input of $\chi_i$ of function $U_{i,j}$, we apply the following approach. First, we derive a 4-bit value v from the input of the white-box implementation. This can be done in any arbitrary way. We use the value v to encode the value $\chi_{i,1}$ by the encoding $\alpha_v$, and the values $\chi_{i,2}, \chi_{i,3}$, and $\chi_{i,4}$ by the encoding $\alpha_v^{lin}$. XORing these values results in the value $\alpha_v(\chi)$. This concludes the introduction of the encodings.

Removal of the encodings:

As indicated, a basic white-box implementation is such that the output $y_{i_1,j}$ of a function $U_{i_1,j}$ is XORed with the output of three other tables $U_{i_2,j}, U_{i_3,j}$, and $U_{i_4,j}$. For this embodiment we assume that the XORing is done as follows. First, $y_{i_1,j}$ is XORed with $y_{i_2,j}$. Next, we XOR this result, to which we refer as $r_1$, with $y_{i_3,j}$. The result $r_2$ of this second XOR is finally XORed with $y_{i_4,j}$ to obtain the value $y_j$.

Let $\beta_{i,j}$ denote the affine encoding with which value $y_{i,j}$ is encoded. Before XORing values, we make that all values $y_{i_2,j}, y_{i_3,j}$, are encoded by the linear part of the encoding of $y_{i_1,j}$, i.e., by $\beta_{i_1,j}^{lin}$. Above, we explained how this can be done. We now XOR the encoded values $\beta_{i_1,j}(y_{i_1,j}), \beta_{i_1,j}^{lin}(y_{i_2,j}), \beta_{i_1,j}^{lin}(y_{i_3,j})$, and $\beta_{i_1,j}^{lin}(y_{i_4,j})$. Note that XORing the encoded values $\beta_{i_1}(y_{i_1,j})$ and $\beta_{i_1}^{lin}(y_{i_2,j})$ results in the encoded value $\beta_{j_1}(r_2)$. XORing this value with $\beta_{i_1}^{lin}(y_{i_3,j})$ results in $\beta_{i_1}(r_2)$, and XORing $\beta_{i_1}(r_2)$ with $\beta_{i_1}^{lin}(y_{i_4,j})$ results in $\beta_{i_1}(y_j)$. From the value $\beta_{i_1}(y_j)$ we finally remove the encoding. Note that removing an encoding can be done in the same way as adding an encoding (it corresponds to adding the inverse of the encoding).

Figure 11:
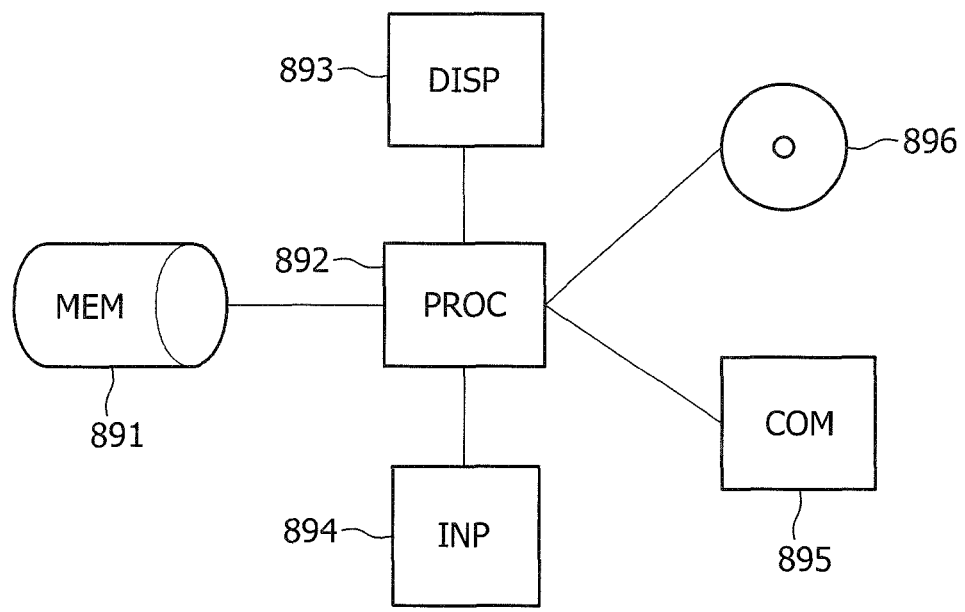
FIG. 11 is a diagram illustrating an embodiment.

FIG. 11 illustrates an embodiment of the invention. The Figure shows a communication port 895 such as a connection to the Internet for connecting with a provider of digital content. The content can also be obtained from medium 896 such as a DVD or CD. Digital content on the PC is typically rendered using media players being executed by processor 892 using memory 891. Such players can execute, for a specific content format, a respective plug-in for performing the format-specific decoding corresponding to content obtained via communication port 895 and/or medium 896. Those content formats may include AVI, DV, Motion JPEG, MPEG-1, MPEG-2, MPEG-4, WMV, Audio CD, MP3, WMA, WAV, AIFF/AIFC, AU, etc. For digital rights management purposes, a secure plug-in may be used that not only decodes the content but also decrypts the content. This plug-in comprises processor instructions and parameters stored in memory 891. Processor instructions may cause the process to perform a method according to the invention. The parameters comprise look-up tables as set forth herein. A user input 894 may be provided to obtain commands from a user to indicate content to be rendered, and display 893 and/or speakers are provided for rendering the decoded and/or decrypted content.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A cryptographic system for performing a keyed cryptographic operation mapping an input-message to an output-message, the system comprising: a computer processor and a memory; wherein the processor is configured for:
   executing the cryptographic operation using a network that comprises (a) a plurality of basic blocks representing said key, (b) an encoder and (c) a compensator, wherein:
      each of the basic blocks is arranged for mapping respective input data to respective output data;
      the plurality of basic blocks are arranged for collectively performing the cryptographic operation;
      the encoder is arranged to encode the output data of a first basic block of the plurality of basic blocks into an encoder-output according a selected encoding scheme;
      the input to a second basic block of the plurality of basic blocks depends on the encoder-output and is encoded according to the selected encoding scheme; and
      the compensator is arranged to recode intermediate data of the network that depends on the output data of the second basic block to compensate for the effect of the encoding by the encoder, the recording being according to a selected recoding scheme; and
   computing selection data based on an input of the encoder, wherein the encoder is arranged for selecting the selected encoding scheme out of a plurality of encoding schemes in dependency on the selection data, and wherein the compensator is arranged for selecting the selected recoding scheme out of a plurality of recoding schemes in dependency on the selection data.

2. The cryptographic system as in claim 1, wherein the plurality of encoding schemes are self-equivalent encoding schemes of the second basic block, to the selected encoding scheme an output encoding scheme corresponds, the output data of the second basic block being encoded according to the output encoding scheme, the selected recoding scheme recodes the output data from the output encoding scheme to a further encoding scheme.

3. The cryptographic system as in claim 1, wherein the plurality of encoding schemes are affine encoding schemes.

4. The cryptographic system as in claim 2, wherein the output data of the first basic block is encoded with an encoding scheme which depends on the selection data.

5. The cryptographic system as in claim 1 wherein the selection data is at least a part of the output of the first basic block.

6. The cryptographic system as in claim 1, wherein the network comprises a decoder for removing an encoding on an output of a third basic block of the plurality of basic blocks according to one of a plurality of encoding schemes.

7. The cryptographic system as in claim 1, wherein the plurality of basic blocks comprises at least a further second basic block arranged for receiving its input through the network encoded according to a further selected encoding scheme, the compensator is arranged for recoding further intermediate data depending on further output data of the further second basic block to compensate for the effect of the further encoding according to a further selected one of a plurality of recoding schemes, the recoding scheme is arranged to recode the intermediate data into first data encoded according to a common encoding scheme, the further recoding scheme is arranged to recode the further intermediate data into second data encoded according to an encoding scheme differing at most an additive with the common encoding scheme.

8. A computer program stored on a non-transitory computer storage medium, wherein the computer program, when executed by a computer processor, performs a cryptographic method for performing a keyed cryptographic operation mapping an input-message to an output-message, the method comprising:
   executing the cryptographic operation using a network that comprises (a) a plurality of basic blocks representing said key, (b) an encoder and (c) a compensator, wherein said executing comprises:
      each of the basic blocks mapping respective input data to respective output data;
      the plurality of basic blocks collectively performing the cryptographic operation;
      the encoder encoding the output data of a first basic block of the plurality of basic blocks into an encoder-output according a selected encoding scheme, wherein the input to a second basic block of the plurality of basic blocks depends on the encoder-output and is encoded according to the selected encoding scheme; and
      the compensator recoding intermediate data of the network that depends on the output data of the second basic block to compensate for the effect of the encoding by the encoder, the recording being according to a selected recoding scheme; and computing selection data based on an input of the encoder, wherein the encoder is arranged for selecting the selected encoding scheme out of a plurality of encoding schemes in dependency on the selection data, and wherein the compensator is arranged for selecting the selected recoding scheme out of a plurality of recoding schemes in dependency on the selection data.

9. A computer program stored on a non-transitory computer readable medium, wherein the computer program, when executed by a computer processor, performs a method of establishing a system for performing a cryptographic operation, the system comprising (a) a plurality of basic blocks, each basic block arranged for mapping respective input data to respective output data, the plurality of basic blocks being arranged for collectively performing the cryptographic operation, (b) an encoder and (c) a compensator, the method comprising:

identifying a first basic block and a second basic block of the plurality of basic blocks, the second basic block being arranged to receive as an input an output of the first basic block, arranging the encoder between the first basic block and the second basic block, the encoder being arranged for encoding the output of the first basic block into an encoder-output according to a selected one of a plurality of encoding schemes, the one of the plurality of encoding schemes being selected based on selection data, the selection data being computed based on the output of the first basic block, the second basic block being adapted for receiving the encoder-output as input data, and arranging the compensator after the second block, for recoding intermediate data to compensate for the effect of the encoding according to a selected one of a plurality of recoding schemes, wherein the intermediate data depends upon output data on the second basic block the compensator being arranged for selecting the selected recoding scheme out of the plurality of recoding schemes in dependency on the selection data.

10. The cryptographic system as in claim 1, wherein the network is arranged for a white-box implementation, and wherein the encoding scheme is selected such that the encoder output is in a non-fixed relationship with individual input values in a non-white-box implementation.

11. The cryptographic system as in claim 1, wherein the selection data is calculated in each round of a white-box Advanced Encryption Standard (AES) implementation.

12. A cryptographic method, executed by a computer processor, for performing a keyed cryptographic operation mapping an input-message to an output-message, the method comprising:

executing the cryptographic operation using a network that comprises (a) a plurality of basic blocks representing said key, (b) an encoder and (c) a compensator, wherein said executing comprises:

each of the basic blocks mapping respective input data to respective output data;

the plurality of basic blocks collectively performing the cryptographic operation;

the encoder encoding the output data of a first basic block of the plurality of basic blocks into an encoder-output according a selected encoding scheme, wherein the input to a second basic block of the plurality of basic blocks depends on the encoder-output and is encoded according to the selected encoding scheme; and the compensator recoding intermediate data of the network that depends on the output data of the second basic block to compensate for the effect of the encoding by the encoder, the recording being according to a selected recoding scheme; and computing selection data based on an input of the encoder, wherein the encoder is arranged for selecting the selected encoding scheme out of a plurality of encoding schemes in dependency on the selection data, and wherein the compensator is arranged for selecting the selected recoding scheme out of a plurality of recoding schemes in dependency on the selection data.

13. A method, executed by a computer processor, for establishment of a system for performing a keyed cryptographic operation, the system comprising (a) a plurality of basic blocks, each basic block arranged for mapping respective input data to respective output data, the plurality of basic blocks being arranged for collectively performing the keyed cryptographic operation, (b) an encoder and (c) a compensator, the method comprising:

identifying a first basic block and a second basic block of the plurality of basic blocks, the second basic block being arranged to receive as an input an output of the first basic block, arranging the encoder between the first basic block and the second basic block, the encoder being arranged for encoding the output of the first basic block into an encoder-output according to a selected one of a plurality of encoding schemes, the one of the plurality of encoding schemes being selected based on selection data, the selection data being computed based on the output of the first basic block, the second basic block being adapted for receiving the encoder-output as input data, and arranging the compensator after the second block, for recoding intermediate data to compensate for the effect of the encoding according to a selected one of a plurality of recoding schemes, wherein the intermediate data depends on output data of the second basic block, the compensator being arranged for selecting the selected recoding scheme out of the plurality of recoding schemes in dependency on the selection data.

* * * * *